No. 794,071. PATENTED JULY 4, 1905.
J. BARBOW.
SURVEYING INSTRUMENT.
APPLICATION FILED NOV. 26, 1904.
2 SHEETS—SHEET 1.
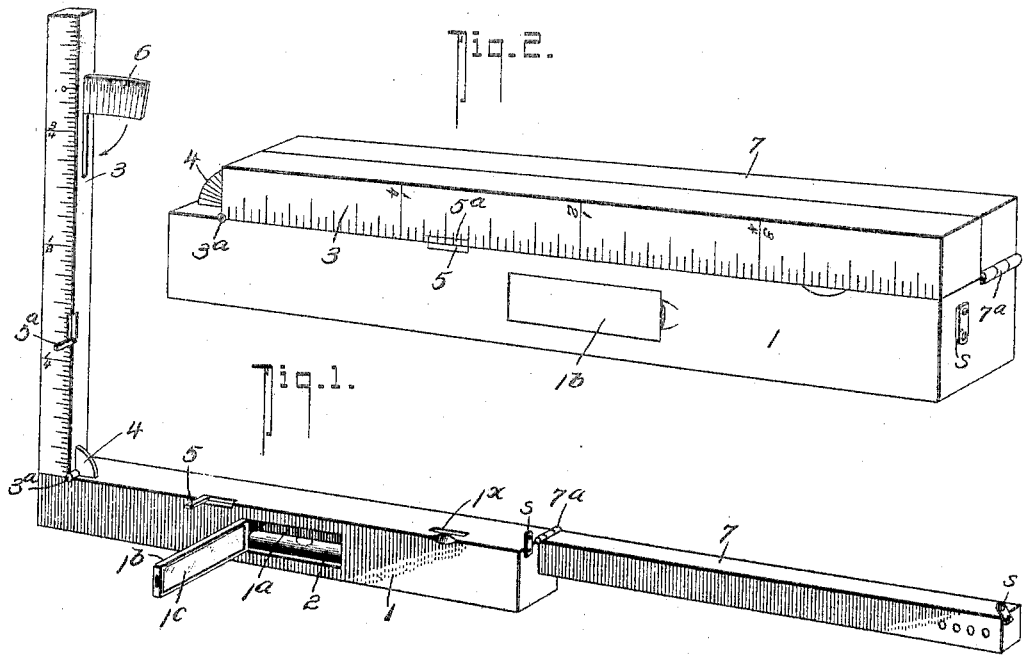
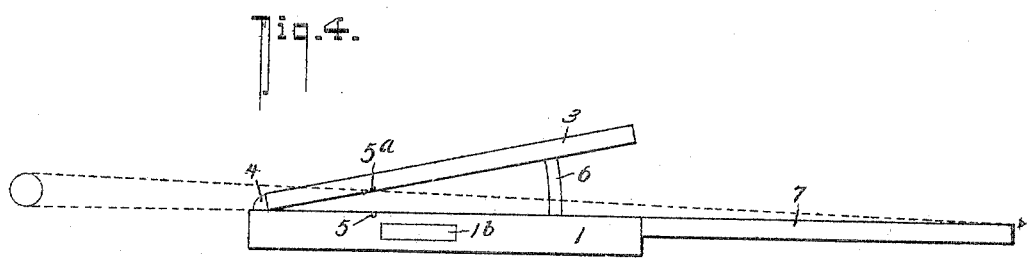
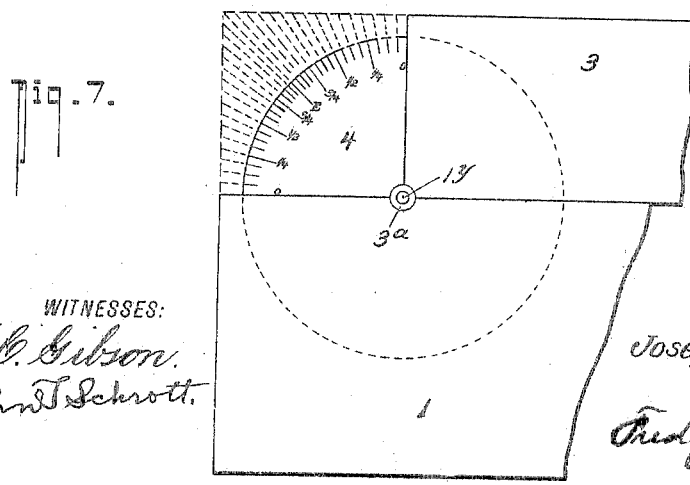
WITNESSES:
F. C. Gibson.
John T. Schrott.
INVENTOR
Joseph Barbow.
BY
Fred G. Dieterich & Co.
ATTORNEYS

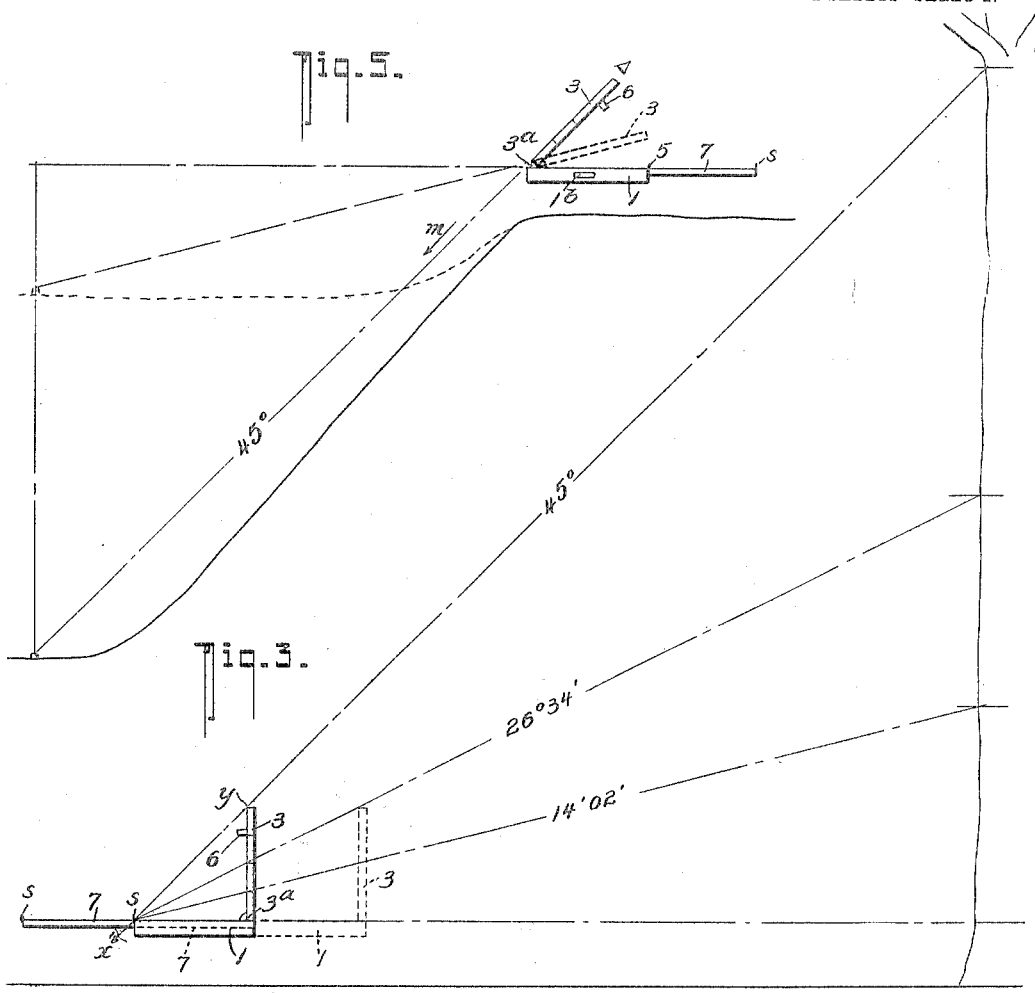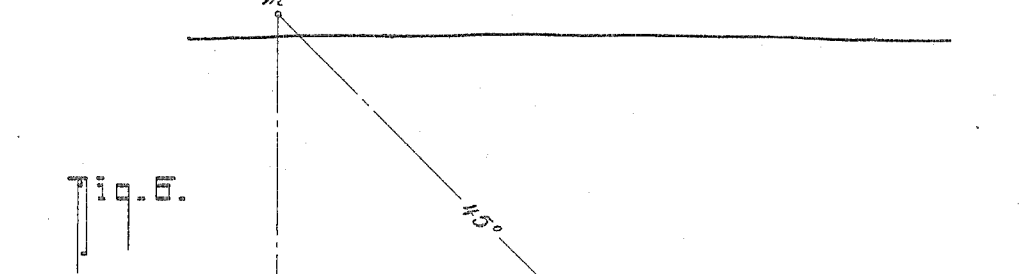

No. 794,071. Patented July 4, 1905.

UNITED STATES PATENT OFFICE.

JOSEPH BARBOW, OF PORTLAND, OREGON.

SURVEYING INSTRUMENT.

SPECIFICATION forming part of Letters Patent No. 794,071, dated July 4, 1905.

Application filed November 26, 1904. Serial No. 234,373.

*To all whom it may concern:*

Be it known that I, JOSEPH BARBOW, residing at Portland, in the county of Multnomah and State of Oregon, have invented certain new and useful Improvements in Surveying Instruments, of which the following is a specification.

This invention relates to the class of surveying and measuring instruments more particularly adapted for measuring altitudes and distances without the use of trigonometrical calculations; and it more particularly seeks to provide an instrument of this character of a very simple and durable construction which will readily serve its intended purposes.

Again, my invention seeks to provide an instrument of this character which is particularly adapted for measuring the height of trees, their diameters at different points, &c., so as to enable the operator to determine the amount of board material therein and so as to enable him the more accurately to calculate the approximate amount of timber on a given section of land and to determine its value as timber-land.

Generically, my invention includes a foldable member having suitable calibrations and leveling devices for making the measurements required.

With other objects in view, which will hereinafter be fully apparent, the invention consists in certain novel construction and combination of parts, which will be first fully described in detail and then specifically pointed out in the appended claims, reference being had to the accompanying drawings, in which—

Figure 1 is a perspective view showing the parts in their open position. Fig. 2 is a similar view, the parts being folded together. Fig. 3 is a diagrammatic view showing the instrument as applied for use in determining the height of trees. Fig. 4 is a similar view showing how the same may be used to determine the diameter of trees. Fig. 5 is a similar view showing how the same may be used to determine the depression of an object. Fig. 6 is a similar view showing how the same may be used to determine the width of a river or other horizontal distances. Fig. 7 is an enlarged detail view hereinafter specifically referred to.

Referring now to the accompanying drawings, in which like characters of reference indicate like parts in all of the figures, it will be seen the instrument comprises a base 1, provided with a chamber $1^a$, closed by a door $1^b$, as shown. In the chamber $1^a$ I dispose a spirit or other level 2 for adjusting the base 1 in a horizontal position. A door $1^b$, provided on its inner face with a mirror $1^c$, whereby the portion of the level 2 may be readily determined during the sighting of the instrument, is hinged to the base 1.

Hingedly secured at $3^a$ to the base 1, near one end of the said base, is an arm 3, which when the parts are folded rests against the base 1, but which when the parts are in their operative position extends at an angle to the base 1, as shown in Fig. 1.

4 designates an arc-plate, (shown in detail in Fig. 7,) which is secured to the base 1 at the joint between the base and the arm 3, and the said plate 4 is graduated according to a square throughout a quadrant of a circle, the middle line "E" being the "equal-line" and graduated to read inversely from the middle line "E" to the zero-lines "0 0," each half of the quadrant being divided from "0" to "E" (forty-five degrees) into sixteen subdivisions, each corresponding to a depression equal to one-sixteenth of the distance from the object, as will be more fully apparent later. The arm 3 is also graduated into equal divisions from end to end for a purpose also presently understood.

5 $5^a$ designate a pair of foldable sights which when in operation project at right angles to the base 1 and the arm 3, one of said sights 5 being carried by the base 1 and the other, $5^a$, being carried by the arm 3. When not in use, the sights 5 $5^a$ may be folded against the base 1 and arm 3, as clearly shown in Fig. 2.

To aid in determining the distance between the sights 5 $5^a$ when my instrument is being used to determine the diameter of trees, I provide an arc-plate 6, secured to the arm 3 and passing through a slot $1^x$ in the base 1, and this arc-plate 6 is graduated into tenths and one-hundredths of an inch divisions, the distance between the sights 5 5ᵃ being thereby magnified a number of times depending upon the relative distances of the sights 5 5ᵃ and the arc-plate 6 from the center 1ʸ of the arm and base-hinge.

7 designates a second arm hinged at 7ᵃ to the opposite end of the base 1 and adapted to open out to form an extension of the base 1 (see Fig. 1) when desired and when not in use to fold up against the base alongside of the arm 3, as clearly shown in Fig. 2.

The arms 7 and 3 and the base 1 may be provided with one or more sights s of any approved type, if found desirable, although the successful operation of my invention does not depend thereon.

At present the more general method of use in determining the value of timber-land is for the estimator to determine the average size of the trees and the amount of lumber therein contained and then multiply it by the number of trees in the given section or subsection or division of land, thus indirectly determining the amount of lumber in that particular land division. The method at present in use for estimating the amount of lumber in the average tree is simply for the estimator by means of his own knowledge or experience in such work to guess at the amount of lumber in said tree, a very unsatisfactory and uncertain method, the estimates of different estimators being almost invariably different from each other. To overcome this unsatisfactory method to a large degree, I have invented my new and improved instrument, which operates substantially in the manner now to be explained.

By referring now more particularly to Fig. 3 of the drawings the operator moves the arm 3 to extend at right angles to the base 1, the arm 7 being still folded against the base. Now the operator sights across the edges $x$ $y$ of the base 1 and arm 3, respectively, along the line marked "45°" and moves toward or from the object whose height is to be determined until the line of sight along "45°" falls at the desired point at the top of the object. The horizontal distance between the eye of the operator and the base of the object operated upon is then measured by the ordinary means—viz., by ordinary rule measurement. The height of the object will then be equal to the horizontal distance between the object and the operator, on the principle that in a right-angled triangle the side opposite an acute angle is equal to the side adjacent. It should be understood that while the operator is making the measurement just referred to he will of course maintain the base 1 in the horizontal position, the position of the base being readily read by the level 2 reflected in the mirror on the door 1ᵇ, the door being open. Now by simply unfolding the arm 7 and sighting from the end of the arm 7 across the end of the arm 3 the mean height of the object will be at once determined. Instead of unfolding the arms 7 the operator, if he so desires, may sight from the edge of the base 1 through the divisions marked "½" on the arm 3, when the mean height of the object will also be directly determined. Should for any reason it be found impossible to get close enough to the object to determine its height by sighting across the edge of the base 1 and the extreme edge of the arm 3, the operator may unfold the arm 7 to extend the base and sight from the extreme edge of the said arm 7 across the extreme edge of the arm 3 until the line of sight along the line marked "26° 34'" falls at the top of the object or tree, the height of which object will be then equal to one-half of the distance between the operator and the object. By then sighting through the "½" division mark of the arm 3 the mean height of the object can be readily obtained. Now to determine the diameter of the object at this point of mean height the operator standing in the same position then places the instrument in the position shown in Fig. 4, the sights 5 5ᵃ being then turned at right angles to the base 1 and arm 3. The operator then sights from the end of the instrument until the side lines of the tree or other object coincide with the sights 5 5ᵃ. Knowing then the distance between the operator and the object and the ratio of distance between the sights 5 5ᵃ as determined by the arc-plate 6, the diameter of the tree will be readily obtained. For example, supposing the diagonal distance is found to be two hundred feet, the arc-plate reading ".03," the sights between 5 5ᵃ will be then .01. Multiplying the diagonal distance by the space between the sights 5 5ᵃ, it will be readily seen that the diameter of the object will be twenty inches. To determine the depression of an object below the horizontal, the instrument is then placed in the position shown in Fig. 5 and the object is sighted along the top edge of the arm 3 in the direction of the arrow $m$, the base 1 being held horizontally and the arm 3 moved up and down until the proper angle between the arm 3 and the base 1 is reached. Then by reading the scale 4 the amount of depression can be noted at a glance. For instance, assuming the operator to be two hundred feet from the object and the reading of the scale 4 to be at "E" (see full lines, Fig. 5) then the depression of the object below the horizontal will be equal to the distance of the operator from the object, or two hundred feet. Again, assuming the reading of the scale 4 to be one-fourth (see dotted lines, Fig. 5) then the depression of the object would be equal to one-fourth of the distance of the operator from the object, or fifty feet.

When my invention is used for determining horizontal distances, such as the width of a river, &c., the parts are adjusted and sighted as shown diametrically in Fig. 6, by reference to which it will be seen that an object M on the opposite side of the stream is sighted directly across the river, as at N, and then a distance along the shore-line is measured, say, a distance equal to ten rods, when the object is sighted again from the point N', so as to form, as it were, a right-angled isosceles triangle. The shore-line between N and N' will be then equal to the distance between the object M on the opposite shore and the point N, or the distance across the river from the object M to the point N will be equal to ten rods, and then by subtracting the distance of the point N from the water's edge the width of the stream can be readily determined.

From the foregoing description, taken in connection with the accompanying drawings, it will be seen that the instrument will not be expensive to manufacture, will be easily operable, and will readily serve its intended purposes in ascertaining the topography of a country approximately and near enough for the kind of work for which it is intended. Again, my invention will be found very useful to any one in setting up timbers or constructing elevated work of any kind, and it may also be used to take the place of a transit instrument. It can be carried in the pocket of the operator very easily. Again, when the sights are folded, the bottom edge of the base 1 being flat and parallel with the level, the instrument can be used as an ordinary contact-level, and with the arm 3 extended out at right angles to the opposite edge the same can be used as a right-angled level for the adjustments of timbers on a wall-section either vertically or horizontally. Again, my invention can be used to ascertain the distance of an object by the use of the sights 5 5ª on the same principle as a stadia measurement is made, since my device can be so turned to read the graduated tape or rod held either vertically or horizontally, and the arc-plate will furnish means for very closely reading the distances between the sights 5 5ª.

Additional usefulness for my instrument will, while same is intended for fieldwork, be found of good service in office-work to plat out on paper or wood whatever the notes taken in the field may be. By placing an arc-plate on the instrument at 7ª, graduated similarly to the plate 4, and by swinging the arm 7 up on its hinge through the arc of the semicircle the different angles may be platted. Instead of providing a second plate 4 the platting may be done by simply adjusting the arm 3 to the proper angles, using the instrument in the same manner as for a protractor. The arm 7 may be provided with a plurality of apertures (see Fig. 1) in which to insert a marker and to regulate the radii of the circles to be drawn when it is desired to do so. The base 1 can be adjusted to either the vertical or horizontal line for the base and arm 3 will describe any angle wanted.

With this instrument the operator can furnish notes to his employer of the following character, to wit: The operator will proceed to select and test a few trees in each legal subdivision by making notes of the reading of the arc and length of horizontal base at each tree and the number of trees in that particular division of land. Now the employer, understanding the work of the instrument, will then be able to figure out the contents of each particular division of land and will soon arrive at the amount of the average tree. Now having the number of trees he will soon arrive at the gross amount for that particular division of land, which, together with the other usual information given by the operator to the employer, will bring the employer in very close touch with his holdings, thus enabling the employer to determine for himself the exact amount of timber-land he owns without the necessity of the owner personally going to the land-surveyor. The notes of depression and elevation of a country may be treated in the same way, &c.

If desired, the arm 3 may be slotted and the plate 6 pivotally secured to the arm, so that it will drop in the slot when the parts are in the position shown in Fig. 1.

From the foregoing description it will be seen that I have provided a very simple means for determining to a more reasonable degree than heretofore the amount of lumber in a given section of land and for determining to within a reasonable degree the vertical or horizontal distance between objects.

From the foregoing description, taken in connection with the accompanying drawings, it is thought the many advantages, complete operation, and construction of my invention will be readily understood by those skilled in the art to which it appertains, and I desire it understood that slight changes in the detailed construction and operation of parts may be made without departing from the scope of my invention or the appended claims.

Having thus described my invention, what I claim, and desire to secure by Letters Patent, is—

1. An instrument of the character stated, comprising a base, an arm pivoted thereto and a scale-plate at the pivot-point for coöperating with said base and said arm for determining the depression of an object for the purposes specified.

2. An apparatus of the character stated, comprising a base, means for determining the height of objects, said means including a foldable arm secured to the base and a scale-plate carried by the base and at its juncture with the arm for the purposes specified.

3. An instrument of the character stated, comprising a base, means for determining the height of an object, said means including a pair of arms hingedly secured to the base, one of said arms having graduations and an arc-plate coöperating with the base and the arm.

4. An apparatus of the character stated, comprising a base, means for leveling said base, a foldable arm having a slotted end and hingedly secured to the base, a gage-plate secured to the base and entering into the slotted end of the arm for coöperating with the arm and the base to indicate the depression of an object for the purposes specified.

5. An instrument of the character stated, comprising a base having a chamber, a level held in said chamber, a door for said chamber, a reflector carried by said door, an arm secured to said base, said arm adapted to be folded against the base, a gage-plate secured to the base and coöperating with said arm for determining the depression of an object for the purposes specified.

6. An instrument of the character stated, comprising a base having a chamber, a level held in said chamber, a door for said chamber, a reflector carried by said door, an arm secured to said base, said arm adapted to be folded against the base, a gage-plate secured to the base and coöperating with said arm for determining the depression of an object, said arm having graduations, said arm and said base being so arranged as to indicate the height of an object for the purposes specified.

7. An instrument of the character stated, comprising a base having a chamber, a level held in said chamber, a door for said chamber, a reflector carried by said door, an arm secured to said base, said arm adapted to be folded against the base, a gage-plate secured to the base and coöperating with said arm for determining the depression of an object, said arm having graduations, said arm and said base being so arranged as to indicate the height of an object, and means for determining the diameter of an object.

8. An instrument of the character stated, comprising a base having a chamber, a level held therein, a door for said chamber, a mirror carried by said door, a graduated arm hingedly secured to said base to be folded thereagainst, a gage-plate secured to the base at the jointure of the base with the arm to indicate the depression of an object, a sight secured to said arm, a second sight secured to said base, a graduated arc-plate secured to said arm for determining the distance between said sights for the purposes specified.

9. An instrument of the character stated, comprising a base having a chamber, a level held therein, a door for said chamber, a mirror carried by said door, a graduated arm hingedly secured to said base to fold thereagainst, a gage-plate secured to the base at the jointure of the base with the arm to indicate the depression of an object, a sight secured to said arm, a second sight secured to said base, a graduated arc-plate secured to said arm for determining the distance between said sights, a second arm hingedly secured to said base and adapted to be unfolded to form an extension of the base, substantially as shown and for the purposes described.

10. An instrument of the character stated, comprising an apertured base, a pair of arms hingedly secured thereto, a sight carried by one of said arms, a second sight carried by the base, an arc-plate secured to said sight-carrying arm and projecting into the base-aperture for the purposes specified.

11. An instrument of the character stated, comprising an apertured base, a pair of arms hingedly secured thereto, a sight carried by one of said arms, a second sight carried by the base, an arc-plate secured to said sight-carrying arm and projecting into the base-aperture, a gage-plate carried by the base and coöperating with said sight-carrying arms, substantially as shown and for the purposes described.

12. An instrument of the character stated, comprising an apertured base, a pair of arms hingedly secured thereto, a sight carried by one of said arms, a second sight carried by the base, an arc-plate secured to said sight-carrying arm and projecting into the base-aperture, a gage-plate carried by the base and coöperating with said sight-carrying arms, and means for leveling said base, substantially as shown and for the purposes described.

13. An instrument of the character stated, comprising a base having a chamber, a level held within said chamber, a hinged door for said chamber, a reflector carried by said door, a foldable arm hingedly secured to the base near one end thereof, a gage-plate secured to the base near one end thereof and coöperating with said arm, a sight carried by said arm, a second sight carried by said base, an arc-plate secured to said arm, said base having an aperture to receive said arc-plate, said arc-plate coöperating with said base and said arm to determine the distance between said sights, a second arm hingedly secured to the base at the other end and adapted to form an extension thereof, both of said arms being so arranged as to fold against the base, substantially as shown and for the purposes specified.

JOSEPH BARBOW.

Witnesses:
OGLESBY YOUNG,
A. T. LEWIS.